March 28, 1967 W. M. RUPP 3,311,811

ODD-ORDER, PARAMETRIC, FREQUENCY MULTIPLIER

Filed April 2, 1963

INVENTOR,
WERNER M. RUPP

BY Edward J. Kelly

ATTORNEY.

3,311,811

ODD-ORDER, PARAMETRIC, FREQUENCY MULTIPLIER

Werner M. Rupp, Elberon, N.J., assignor to the United States of America as represented by the Secretary of the Army Filed Apr. 2, 1963, Ser. No. 270,126
3 Claims. (Cl. 321—69)

The invention described herein may be manufactured and used by or for the Government for governmental purposes, without the payment of any royalty thereon.

This invention relates to frequency multipliers and particularly to frequency multipliers used as harmonic generators. More particularly, this invention relates to parametric frequency multipliers.

Frequency multipliers are well known, and parametrically excited circuits have been found to be very effective as frequency multipliers because of the high order of harmonics generated by their non-linear reactances. However, for proper operation, the conventional parametric frequency multipliers require two or more filter networks with extremely high Q components. Consequently, the adaptation of a conventional parametric circuit for frequency multiplication is very costly, and it requires the highest quality components and meticulous tuning.

It is therefore an object of this invention to provide an improved frequency multiplier that is a highly efficient, odd-order harmonic generator.

It is a further object of this invention to provide an improved odd-order frequency multiplier that does not require filter networks.

It is a further object of this invention to provide an improved frequency multiplier that is easily tuned and highly stable.

It is a further object of this invention to provide an improved frequency multiplier that can be easily made from low cost parts, and that has a straightforward circuit design for efficient, reliable operation.

These and other objects of this invention are accomplished by the parallel coupling of two, series-resonant, parametric, frequency-multiplier circuits tuned to the same harmonic frequency; with their variable reactance elements connected in the opposite sense. Both of the parametric amplifiers are fed from the same source of pump energy at a fundamental frequency, and the output is taken from a coupling common to the inductive elements of both parametric amplifiers.

This invention will be better understood and other and further objects of this invention will become apparent from the following specifications and the drawings of which, FIGURE 1 is a circuit diagram of this invention.

Figure 1:
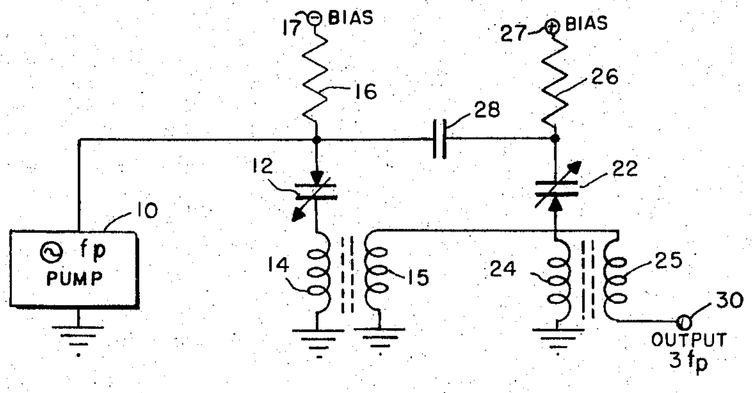

Referring now more particularly to FIGURE 1, the source of pump energy 10 is connected across a first, series-resonant, tuned-circuit consisting of a variable-capacitor diode 12 and an inductor 14. The source of pump energy is also connected through the decoupling condenser 28, to a second, series-resonant, tuned-circuit consisting of the variable-capacitor diode 22 and the inductor 24.

The inductor 14 is transformer-coupled to the coil 15, and the inductor 24 is transformer-coupled to the coil 25. The two coils 15 and 25 are connected in series between an output terminal 30 and ground.

The bias voltage for the variable-capacitor diode 12 is provided, through the decoupling resistor 16, by the source of bias voltage 17. The bias voltage for the variable-capacitor diode 22 is provided, through the decoupling resistor 26, by the source of bias voltage 27.

In operation, the pump 10 provides energy, at a given frequency $f_p$, to the series-resonant circuits, which include harmonic-generating, non-linear reactances, tuned to one of the odd-order harmonics such as $3f_p$. The non-linear reactance, in each of these tuned circuits is a variable-capacitor diode, which causes each of the circuits to resonate in accordance with parametric excitation. The parametric excitation resonance includes a very high content of harmonics, as is well known, including the odd-order harmonics. Consequently, the two, series-resonant circuits, tuned to an odd-order harmonic, such as $3f_p$, will both make available a spectrum of even and odd-order harmonics of the given pump frequency; with a predominent contribution from that odd-order harmonic frequency to which the two resonant circuits are tuned. However, due to the phase reversal of the two variable-capacitor diodes, each of the series-resonant circuits will be excited in a different mode of parametric excitation. These two modes differ insofar as their even harmonics are in-phase, whereas their odd-order harmonics are out-of-phase with respect to each other.

The two modes of parametric excitation are also out-of-phase with respect to the given fundamental frequency so that each of the circuits will receive a maximum of pump energy on an alternate one of the peaks of the pump voltage. This makes the effective load on the pump less than if the apparent loads were effectively connected in parallel, with both loads draining identical energy simultaneously from thhe pump. In other words, the peak loading of the pump is alternated between the two tuned circuits to provide the most effective use of the available pump energy. Thus the maximum possible energy available from the pump is divided between the two circuits tuned to the desired odd-order harmonic frequency.

The odd-order harmonic energy content of the two resonant circuits is combined in the series connected, inductively coupled coils 15 and 25. The outputs of the circuits supplement each other to give the maximum available energy from both. The reversal of phase between the outputs of the two resonant circuits, due to the two modes of parametric excitation, is taken care of by reversing the polarity of the series connections of the coils 15 and 25 as is apparent from the connections in FIGURE 1.

No filters are necessary in this circuit because of the filtering action of the two tuned circuits and the canceling action of the connections of the outputs of the two tuned circuits.

Although the even-order harmonics adjacent to the chosen odd-order harmonic will have an appreciable energy content, the coupling of the output coils in opposition cancels virtually all of the even-order harmonic energy content that may exist in the two-series-resonant, tuned circuits. The odd-order harmonics are far enough removed in frequency, from that of the tuned circuits, that only an insignificant amount, even of the adjacent, odd-order harmonics, will reach the output coils.

Figure 2:
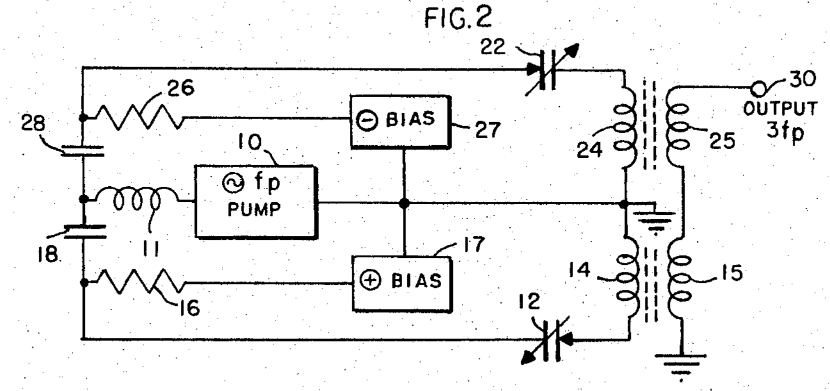
FIGURE 2 is a circuit diagram of another embodiment of this invention.

FIGURE 2 shows a preferred embodiment of this invention, with a symmetrical connection of the two tuned circuits. In FIGURE 2, as well as in FIGURE 3, the elements having the same functions as the elements of FIGURE 1 have been given the same numerical designation. The pump 10 is connected through the decoupling condensers 18 and 28, across the two; series-resonant, tuned circuits, each consisting of one of the variable-capacitor diodes 12 and 22 and one of the inductors 14, and 24, as in FIGURE 1. The coupling condenser 28 couples to the second of the tuned circuits as in FIGURE 1; however, in the embodiment of FIGURE 2, the additional coupling condenser 18 is added to provide electrical symmetry between the two paths across the source of pump energy.

The sources of bias voltage 17 and 27 are the same as in FIGURE 1 and performs the same function. The coils 15 and 25 inductively coupled to the inductors 14 and 24 are also the same in both figures.

The additional coil 11 is added in FIGURE 2 to indicate, and provide a means for, the additional feature of the tuning of the circuit, associated with the pump, to the pump frequency. The output impedance of the pump should match that of the load supplied by the two series resonant tuned circuits for maximum efficiency.

Figure 3:
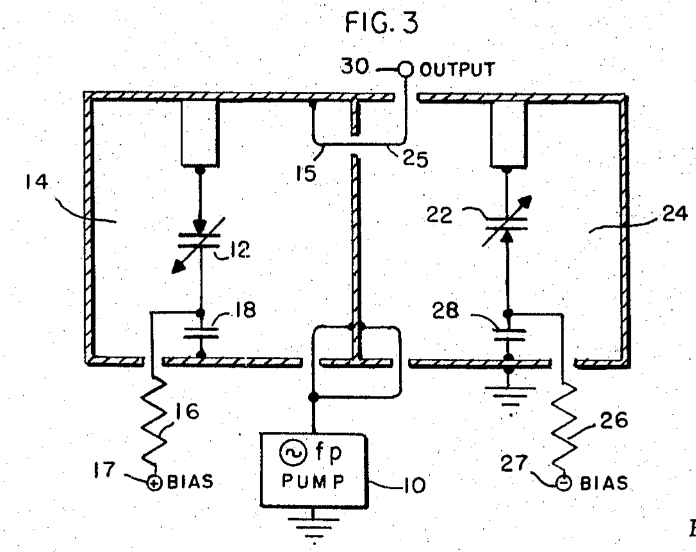
FIGURE 3 is a sectional representation of a microwave version of this invention.

FIGURE 3 shows a microwave version of this invention wherein the series-resonant circuits, tuned to the odd-order harmonic of the frequency of pump 10, are the waveguide sections 14 and 24. The variable-capacitor diodes 12 and 22 still provide the parametric, harmonic generation when energized by the pump 10. However, the pump 10 is now inductively coupled to the microwave cavities and the diodes through the inductive loops 32. The isolation of the direct current bias sources 17 and 27 is accomplished here by the decoupling condensers 18 and 28.

The function of the series connected output coils 15 and 25 of the other figures is accomplished here by the inductively coupled loop 15–25 which is connected between the wall of the waveguide and the output terminal 30.

The two separate coils 15 and 25, connected in series in FIGURES 1 and 2 may also be connected in parallel, in a well known manner, as long as the polarity of the coils necessary to perform the function described in the foregoing discussion of the operation of this invention is preserved. The parallel connection will provide a lower output impedance.

These two separate coils 15 and 25 may also be replaced by a single secondary winding of a transformer having two separate primary windings if one of the primary windings of such a transformer is connected in series with each of the series-resonant, tuned circuits. In this case the primary windings must have negligible inductance with respect to that of the inductors 14 and 24.

As an additional variation, in some cases, the sources of bias voltage 17 and 27 and the resistors 16 and 26 may be omitted. In this case the variable-capacitor diode is coupled directly to the source of pump energy. This mode of operation relies on the self biasing of the diodes, due to the application of the pump voltage; and is preferable for use in microwave circuitry; and may, in some cases, produce a simpler, and more efficient circuit.

In a typical embodiment of this invention, as seen in FIGURE 2, a pump frequency of 1 mc. supplies a third harmonic output of 3 mc. The variable capacity diodes are of the PC–117–47 variety which have a capacity of 80 micromicrofarads at a potential of −1 volt. The inductors 14 and 24 have inductances of 35 microhenries; the resistors 16 and 26 have resistances of 0.5 megohm; the condensers 18 and 28 have capacities of 0.1 microfarad; and the inductor 11 has an inductance of 140 microhenries. The bias 17 is +1 volt and the bias 27 is −1 volt.

Having thus described my invention, what is claimed is:

1. An odd-order harmonic generator comprising a source of pump voltage; a source of negative bias voltage; a first resistor, a first variable-capacitor diode, and a first inductor connected in series across said source of negative bias voltage, with the anode of said first diode connected to said first resistor; said first diode and said first inductor comprising a first resonant circuit tuned to said odd-order harmonic of the frequency of said pump; a source of positive bias voltage; a second resistor, a second variable-capacitor diode, and a second inductor connected in series across said source of positive bias voltage, with the cathode of said second diode connected to said second resistor; said second diode and said second inductor comprising a second resonant circuit tuned to said odd-order harmonic of the frequency of said pump; means for connecting said source of pump voltage across the series combination of said first diode and said first inductor; means for connecting said source of pump voltage across the series combination of said second diode and said second inductor; a first coil inductively coupled to said first inductor; a second coil inductively coupled to said second inductor; means for connecting said first and second coils, with the voltages produced by said odd-order harmonics of said first and second tuned circuits in phase, to an output circuit.

2. An odd-order harmonic generator comprising a source of pump energy at a given frequency; a first tuned waveguide, resonant at an odd-order harmonic of said given frequency; a first variable-capacitor diode positioned within said first waveguide, the anode of said first diode being connected to said first waveguide; a first decoupling condenser connecting the cathode of said first diode to said first waveguide; a second tuned waveguide, resonant at said odd-order harmonic of said given frequency; a second variable-capacitor diode positioned within said second waveguide, the cathode of said second diode being connected to said second waveguide; a second decoupling condenser connecting the anode of said second diode to said second waveguide; means for coupling said source of pump energy to both of said waveguides; and means for coupling both of said waveguides, in phase with respect to said odd-order, harmonic, to an output circuit.

3. An odd-order harmonic generator as in claim 2 having a first source of bias voltage, positive with respect to the potential of said first waveguide; a first resistor connecting said first source of bias voltage to the cathode of said first, variable-capacitor diode; a second source of bias voltage, negative with respect to the potential of said second waveguide; and a second resistor connecting said second source of bias voltage to the anode of said second variable-capacitor diode.

References Cited by the Examiner

UNITED STATES PATENTS

| | | | |
|---|---|---|---|
| 2,460,012 | 1/1949 | Hurault | 321—69 |
| 3,076,133 | 1/1963 | Holcomb | 321—69 |
| 3,085,205 | 4/1963 | Sante | 328—16 |
| 3,165,690 | 1/1965 | Kaufman | 321—69 |
| 3,255,400 | 6/1966 | Morgan | 321—69 |

OTHER REFERENCES

"Parallel Varactor Divide Frequency Multiplier" by E. A. Jelesiewicy; RCA TN No. 650; November 1965, 2 pages.

JOHN F. COUCH, *Primary Examiner.*

G. GOLDBERG, *Assistant Examiner.*